United States Patent [19]

Boeckmann et al.

[11] Patent Number: 4,733,778

[45] Date of Patent: Mar. 29, 1988

[54] REUSEABLE CARRIER TAPE

[75] Inventors: Hugo Boeckmann, Arlington Heights, Ill.; Steven Ausnit, New York, N.Y.; Robert S. Nocek, Stamford, Conn.

[73] Assignee: Illinois Tool Works Inc., Chicago, Ill.

[21] Appl. No.: 913,131

[22] Filed: Sep. 25, 1986

[51] Int. Cl.$^4$ .............................................. B65D 73/02
[52] U.S. Cl. .................................... 206/332; 206/328; 220/306
[58] Field of Search ................ 220/306, 307; 206/328, 206/332; 383/63, 64, 65

[56] References Cited

U.S. PATENT DOCUMENTS

| | | | |
|---|---|---|---|
| 3,280,870 | 10/1966 | Bundy | 383/63 |
| 3,338,285 | 8/1967 | Jaster | 383/65 |
| 3,347,298 | 10/1967 | Ausnit et al. | 383/65 |
| 3,672,495 | 6/1972 | Bauer et al. | 206/328 |
| 3,695,414 | 10/1972 | Wiesler et al. | 206/328 |
| 3,846,737 | 11/1974 | Spaulding | 220/307 |
| 4,421,246 | 12/1983 | Schultz et al. | 220/307 |
| 4,444,309 | 4/1984 | Morton, Jr. | 206/328 |
| 4,616,764 | 10/1986 | Utoh et al. | 220/307 |

FOREIGN PATENT DOCUMENTS 840714  7/1960  United Kingdom ................ 220/307

*Primary Examiner*—Joseph Man-Fu Moy
*Attorney, Agent, or Firm*—Kane, Dalsimer, Sullivan, Kurucz, Levy, Eisele and Richard

[57] ABSTRACT

A carrier tape is provided comprising a longitudinally extending base strip and a generally coextensive cover strip. The strips are extruded of a plastic material with at least one of the strips being formed with an integral longitudinal profile and the other of the strips having surfaces thereon which engage the profile in a continuous mechanical interlock. The surfaces of the other strip may comprise a mating profile. At least one of the strips is provided with longitudinally spaced cavities for receiving products to be carried. The tape is also provided with spaced sprocket holes for driving the tape.

14 Claims, 11 Drawing Figures

REUSEABLE CARRIER TAPE

BACKGROUND OF THE INVENTION

The present invention relates to carrier tapes and in particular to a reuseable carrier tape for transporting electronic components, pharmaceuticals, and the like during production and assembly operations.

In the assembly of various types of electronic devices, such as, for example, computers and related products, it is common to transport miniature and subminiature components from one station to another by means of a carrier tape. At the assembly stations automatic equipment functions to remove the components from the carrier tape and mount the components to a circuit board or the like as may be required. The carrier tape (or transfer tape as it is sometimes referred to) may also function to bring different components to an assembly station in proper order for sequential assembly. Such tapes are often formed from an elongated base strip of plastic or paper usually covered by a cover strip. The base strip is often provided with cavities which are contoured to hold the components in a particular orientation. The cover strip is usually held in place by an adhesive or heat bond which must be broken at the assembly station to permit the component to be removed after the cover is stripped back. Typical examples of prior art carrier tapes are disclosed in U.S. Pat. Nos. 3,465,874; 3,650,430; 3,700,019; 3,894,896; 3,910,410 and 4,298,120.

A problem often associated with such prior carrier tapes is that the cover sheet must be securely affixed to the base and the adhesive bond must subsequently be broken without damaging the cover sheet or base since this could interfere with the transport mechanism. In the past adhesives and heat sealing were the principal means for sealing the base and cover sheets which often rendered the base and/or cover sheet non-reuseable. In many ultra-clean applications the use of such adhesives and heat bonds is undesirable out of concern that residue may contaminate the component or mounting board. In addition, heat seal bonds are generally non-uniform due to the occurrence of tiny hills and valleys on the strip during the heating operation. This may result in the cover sheet stripping away prematurely, (which could result in lost components) or remaining in place overly long. In either event the automatic operation would be interferred with.

Also, with many electronic components it is desireable to load the carrier tape with static-dissipative or conductive materials to prevent or dissipate any build-up of electrostatic charge. These materials often tend to interfere with the bonding characteristics of the adhesives used.

In U.S. Pat. Nos. 3,465,874 and 3,650,430 an attempt is made to solve these problems by providing spaced snaps or push buttons on one of the strips to engage spaced holes in the other of the strips. This arrangement, obviously requires somewhat precise alignment of the snaps and openings in order to operate. Further, the strips are not uniformly secured to each other but rather continuously oscillate between secured and non-secured conditions.

In view of the above, it is the principal object of the present invention to provide an improved carrier tape construction in which the base and cover strips are uniformly and consistently secured to each other and which requires a uniform force for separation so that they may readily be separated in a precise manner.

A further object is to provide such a carrier tape in which the components are reuseable.

Still another object is to provide a carrier tape which may readily be used on existing equipment with little or no modification and which is competitive pricewise with existing products.

SUMMARY OF THE INVENTION

The above and other beneficial objects and advantages are attained in accordance with the present invention by providing an improved carrier tape comprising an elongated base strip and an elongated cover strip both formed of a plastic film material. One of the strips, usually the base strip, may be provided with longitudinally spaced cavities for the components as well as longitudinally spaced sprocket drive holes for advancing the tape through the assembly mechanism. A longitudinally extending continuous profile is integrally formed on at least one of the strips to cooperate with surfaces of the other strip to secure the two in a locking engagement. The surfaces of the other strip may comprise an integral profile complementary to that of the one strip.

DETAILED DESCRIPTION OF THE PREFERRED EMBODIMENTS

Figure 1:
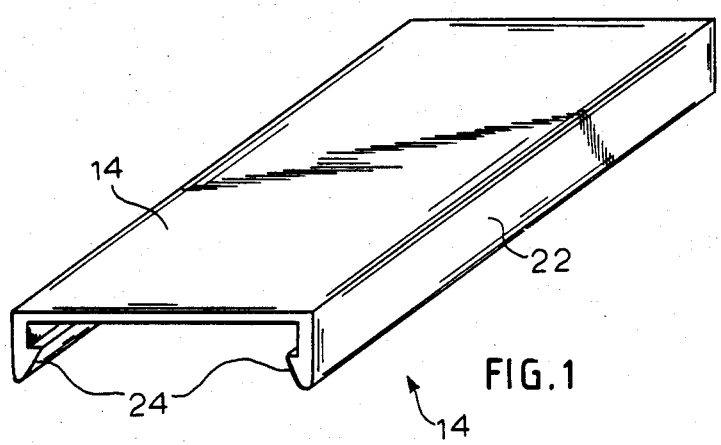
FIG. 1 is a perspective view of a cover sheet of a first embodiment of a carrier tape in accordance with the present invention.
Figure 3:
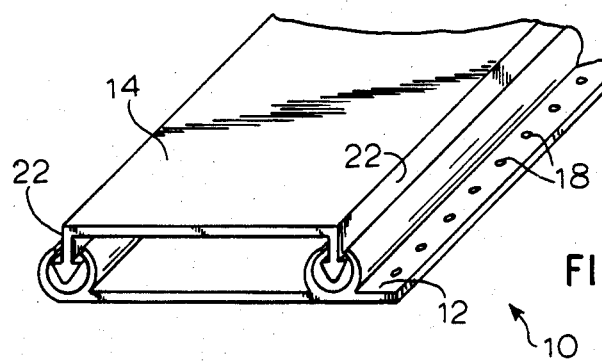
FIG. 3 is a perspective view of a carrier tape formed of cover and base sheets as shown in FIGS. 1 and 2 (but with slightly modified profiles)
Figure 2:
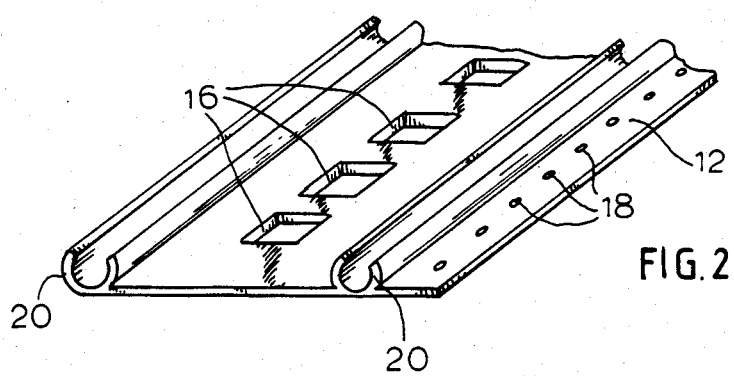
FIG. 2 is a perspective view of the base sheet of the carrier tape of FIG. 1.

Reference is now made to the drawings and to FIGS. 1–3 in particular wherein a first embodiment of the carrier tape 10 of the present invention is depicted comprising an elongated base strip 12 and a generally coextensive cover strip 14. The carrier tape 10 is preferably formed of a suitable plastic film material such as polyvinyl chloride, polypropylene or a polyester glycol such as polyethylene terephthalate glycol which may readily be extruded and vacuum or pressure formed to the desired shape. The tape should be sufficiently flexible to permit it to be spooled. The base 12 is formed with a plurality of cavities 16 which define individual pockets for the components to be transported. In this regard the cavities may be contoured, as required, to maintain the components in a particular orientation should such orientation be necessary. The base strip 12 is further provided with longitudinally spaced sprocket holes 18 which are designed to be engaged by an appropriate sprocket drive on the assembly equipment which serves to propel the tape. Although the sprocket holes are usually in the base strip, if required they may be positioned in the cover strip or extending through both the base strip and the cover strip.

In accordance with the present invention, a profile shape 20 is extruded along each edge of the base strip 12. The profile is formed, for example, in the female shape described in U.S. Pat. No. Re. 28,969 and is designed to cooperate with complementary male profiles on the cover sheet 14 in a manner such as described in U.S. Pat. Nos. 3,893,212; 3,982,306 and 3,999,258. Thus, the cover sheet 14 is provided with downwardly extending edges 22 which terminate in male profiles 24. The male profiles may be of the assymetric arrowhead shaped configuration described in the aforementioned U.S. Pat. No. Re. 28,969 or the profiles may be of a simplified shape as shown in FIG. 1. The shape chosen for the profiles, to a large extent will depend upon the force desired or required for separating the base sheet from the cover sheet. This, in turn, will depend upon the assembly equipment with which the tape is to be used.

Figure 4:
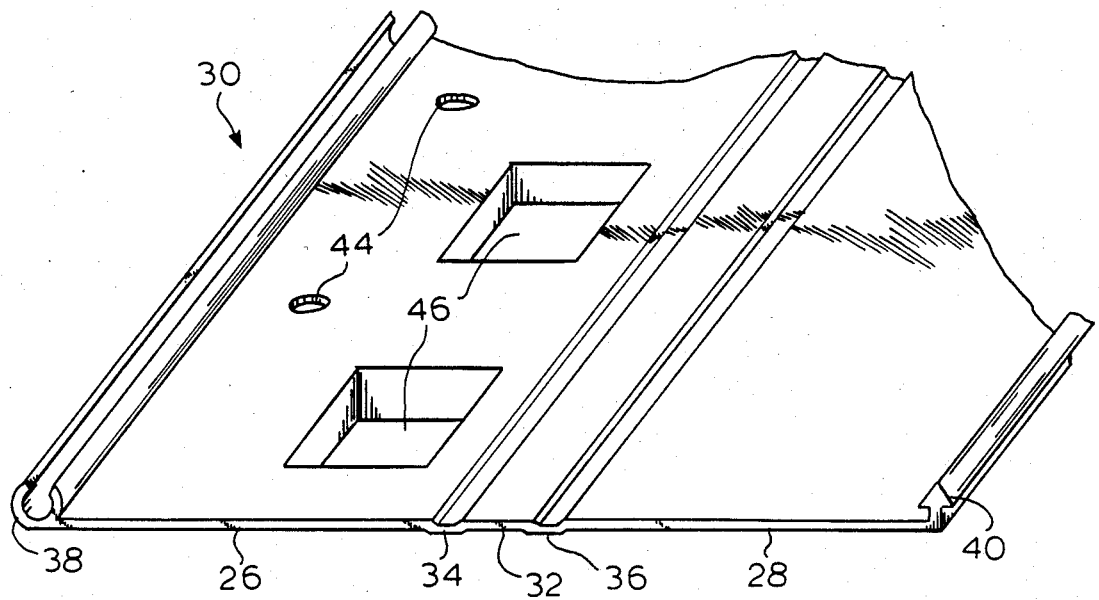
FIGS. 4 and 5 are perspective views depicting the opened and closed conditions of a second embodiment of a carrier tape wherein the cover and base sheets are formed in one piece.
Figure 5:
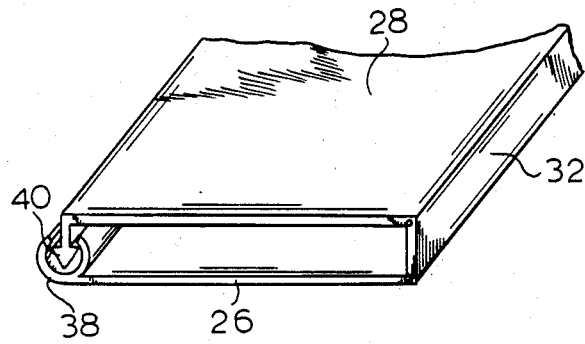

In FIGS. 4 and 5 a second embodiment of the present invention is shown. In this embodiment the base strip 26 and the cover strip 28 of the carrier tape 30 are formed in one piece separated by a side section 32 defined between a pair of longitudinally extending crease lines 34, 36. A female profile 38 extends upwardly from one longitudinal edge and a mating male profile 40 extends upwardly from the opposite longitudinal edge. Component cavities 42 and sprocket holes 44 are formed in the base strip 26 as previously described. When the carrier tape is in the closed position (shown in FIG. 5) the male profile is positioned to engage the female profile to position and secure the cover sheet firmly over the base sheet thereby securing any components within the component cavities. The configuration of the male and female profiles may be shaped as previously described.

Figure 6:
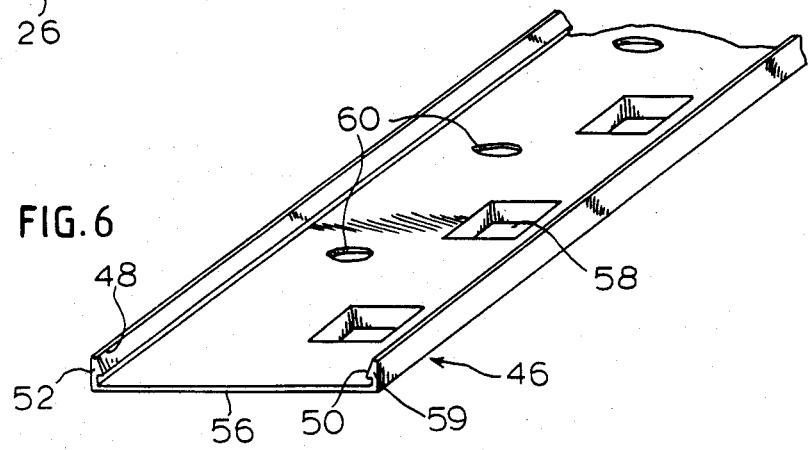
FIG. 6 is a perspective view of the base strip of a third embodiment of the carrier tape of the present invention.
Figure 7:
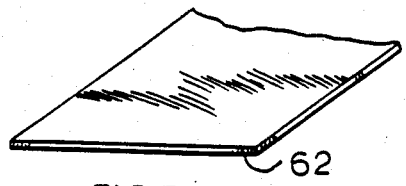
FIGS. 7 and 8 are perspective views of the cover strip of the carrier tape of the third embodiment shown before and after securement to the base strip.
Figure 8:
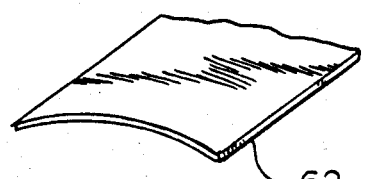
Figure 9:
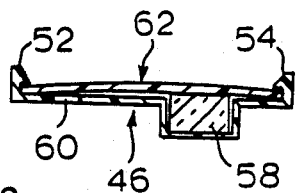
FIGS. 9 and 9A are a side elevational sectional views of the third embodiment of the carrier tape of the present invention and a modification thereof; and, FIG. 10 is a side elevational sectional view of a fourth embodiment of the carrier tape of the present invention.
Figure 9A:
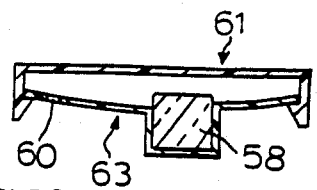

In FIGS. 6-9 a third embodiment of the present invention is depicted. In this embodiment the base strip 46 is formed with profiles 48, 50 at its opposed longitudinal edges. The edges are formed with inwardly turned lips 52, 54 which are directed toward each other. The profiles are configured so that the lips are spaced above the base 56 of the strip 46 as shown in FIGS. 6 and 9. The base strip 46 includes a series of longitudinally spaced component cavities 58 and sprocket holes 60. In this embodiment the cover strip 62 comprises an elongated strip of plastic material designed to snap fit into position. That is, the cover sheet which tends to be naturally flat (as shown in FIG. 7) is curved (as shown in FIG. 8) to permit it to pass between the profiles of the base sheet and to snap into position captured beneath the lips 52, 54 as shown in FIG. 9. In this position the cover sheet tends to press against any components seated within the cavities 58 to secure the components against any extraneous movement. A modification of this embodiment is shown in FIG. 9A. In this embodiment the base sheet 63 is formed with product cavities 58 and sprocket holes 60. The cover 61 may be as shown in FIG. 1.

Figure 10:
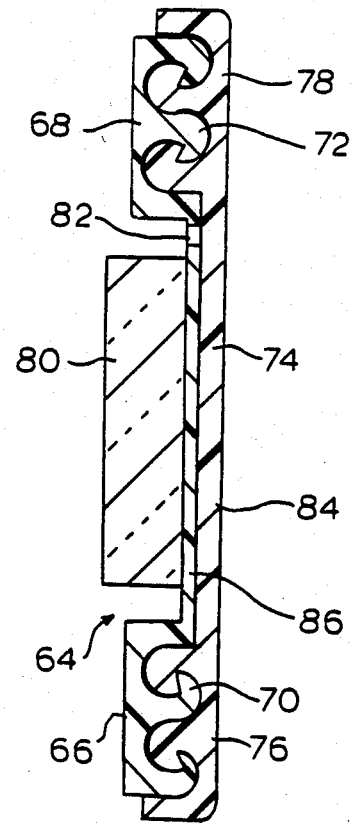

In the embodiment of FIG. 10 the base strip 64 is formed with outer margin portions 66, 68 which carry profiles 70, 72. The cover strip 74 is also formed with outer margin portions 76, 78 which carry profiles complementary to those on the base strip. Component cavities and sprocket holes are formed in the base strips as previously described. This embodiment has the advantage of enabling the cover strip to fit tightly against the base strip since the main portion 84 of the cover strip can sit firmly atop the main portion 86 of the base strip.

In each of the above embodiments the base strip and cover strip may readily be extruded of plastic material with the profiles formed integrally. It is important to note that the profiles are continuous over the length of the strip (or strips) so that the strips may be engaged without any longitudinal alignment and without regard to the relative longitudinal positions of the base strip and cover strip. The plastic material may be formulated so as to give the tape desired physical properties such anti-magnetic, antistatic, infra-red impervious or the like. Although the component cavities are shown in the base strip in each embodiment it should be appreciated that all or a portion of the component cavities may be formed in the cover strip if required by a particular application.

Thus, in accordance with the above, the aforementioned objectives are effectively attained.

Having thus described the invention, what is claimed is:

1. A carrier tape comprising:
   an elongated base strip;
   an elongated cover strip substantially coextensive in length with said base strip;
   a plurality of component cavities spaced longitudinally along one of said strips;
   at least one of said strips being formed with an integral, longitudinally extending continuous profile; and,
   longitudinally extending continuous surfaces on the other of said strips contoured to engage said profile to secure said cover strip to said base strip in a releasable mechanical bond whereby selected ones of said cavities may be selectively uncovered to permit removal of the contents of said cavities.

2. The carrier tape in accordance with claim 1 wherein at least one of said strips includes a plurality of longitudinally spaced sprocket holes extending therethrough.

3. The carrier tape in accordance with claim 1 wherein said base strip and cover strip include integral, longitudinally extending profiles along both edges thereof, the profiles of the cover strip being configured to interlock with the profiles of said base strip.

4. The carrier tape in accordance with claim 1 wherein one longitudinal edge of said base strip is integrally connected to one longitudinal edge of the cover strip.

5. The carrier tape in accordance with claim 4 wherein said one strip profile is disposed along the longitudinal edge opposite to said connected edge.

6. The carrier tape in accordance with claim 5 wherein said engaging surfaces of said other strip comprise a profile disposed along the longitudinal edge opposite to said connected edge.

7. The carrier tape in accordance with claim 6 wherein at least one of said strips includes a plurality of longitudinally spaced sprocket holes extending therethrough.

8. The carrier tape in accordance with claim 1 wherein said one strip includes two longitudinally extending parallel profiles including lip portions directed toward each other and the longitudinally extending surfaces of the other of said strips comprising the longitudinal edges thereof, said edges being spaced apart from each other a distance sufficient to enable said edges to snap fit under said lips to thereby secure said strips to each other.

9. The carrier tape in accordance with claim 8 wherein said one strip includes a plurality of longitudinally spaced sprocket holes extending therethrough.

10. The carrier tape in accordance with claim 9 wherein said cavities are disposed along said one strip.

11. The carrier tape in accordance with claim 8 wherein said other strip includes a plurality of longitudinally spaced sprocket holes extending therethrough.

12. The carrier tape in accordance with claim 8 wherein said cavities are disposed along said other strip.

13. The carrier tape in accordance with claim 1 wherein each of said strips includes a longitudinally extending main body portion; longitudinally extending margins on both sides of said main body portion; and said strips each have mating profiles disposed along each of said margins.

14. The carrier tape in accordance with claim 10 wherein at least one of said strips includes a plurality of longitudinally spaced sprocket holes extending therethrough.

* * * * *